United States Patent [19]

Gümbel et al.

[11] 4,386,943
[45] Jun. 7, 1983

[54] TREATED POLYESTER FABRIC FOR USE IN FLEXIBLE ABRASIVES

[75] Inventors: Harald Gümbel, Garbsen; Günter Bigorajski, Gehrden, both of Fed. Rep. of Germany

[73] Assignee: Vereinigte Schmirgel- und Maschinen Fabriken Aktiengesellschaften, Hannover-Hainholz, Fed. Rep. of Germany

[21] Appl. No.: 163,951

[22] Filed: Jun. 30, 1980

[30] Foreign Application Priority Data

Jul. 14, 1979 [DE] Fed. Rep. of Germany ....... 2928484

[51] Int. Cl.³ .............................................. B61L 29/08
[52] U.S. Cl. ..................................... 51/298; 427/209; 427/389.9; 427/412; 428/240; 428/260; 428/265; 428/272; 428/283; 428/290; 428/480; 428/483
[58] Field of Search ............... 428/265, 272, 290, 480, 428/483, 240, 260, 283; 51/298; 427/209, 389.9, 412

[56] References Cited

U.S. PATENT DOCUMENTS

| 3,524,763 | 8/1970 | Travella et al. | 428/280 |
| 4,038,046 | 7/1977 | Supkis | 51/298 |
| 4,111,667 | 9/1978 | Adams | 428/265 |
| 4,140,829 | 2/1979 | Pemrick et al. | 428/265 |
| 4,215,171 | 7/1980 | Marco | 428/265 |
| 4,225,321 | 9/1980 | Swiatek | 428/265 |

FOREIGN PATENT DOCUMENTS

| 46-8959 | 1/1971 | Japan | 428/265 |
| 1515522 | 6/1978 | United Kingdom . | |
| 1575972 | 10/1980 | United Kingdom . | |

Primary Examiner—James J. Bell
Attorney, Agent, or Firm—Browdy & Neimark

[57] ABSTRACT

A treated polyester fabric for use as a carrier for a flexible abrasive is impregnated with a substance which comprises at least one amine formaldehyde resin. Preferably, in the dry state, the impregnating substance comprises at least 10% by weight of the resin(s), and weighs at least 20% of the weight of the fabric alone. Urea and melamine formaldehyde resins are particularly useful.

11 Claims, No Drawings

TREATED POLYESTER FABRIC FOR USE IN FLEXIBLE ABRASIVES

This invention relates to treated polyester fabric for use in flexible abrasives.

To produce flexible abrasives on a fabric base, it is usually necessary to provide the carrier fabric with a finish before applying a layer of bonding agent intended to anchor abrasive grains. This finish is to fulfill several functions. It is to provide the raw fabric with adequate stability and rigidity, to lend the surface of the fabric a structure adapted to the size of the abrasive grains to be applied, to produce a prescribed flexibility and expansion for the finished abrasive, and to ensure that the grain - bonding agent layer is securely anchored on the fabric.

With carrier fabrics consisting of polyester, these requirements cannot be met with finishing substances known from finishing cotton cloths. Therefore, the development of abrasives based on polyester fabrics has had recourse to knowledge acquired in the rubber industry, in order to provide secure adhesion between polyester and elastomers.

Hence, German Offenlegungsschrift No. 2 531 642 prescribes pre-treating a polyester fabric with a resorcin formaldehyde resin.

German Offenlegungsschrift No. 2 624 029 describes a finish based on phenol formaldehyde resins.

According to one aspect of the present invention, there is provided a treated polyester fabric for use as a carrier for a flexible abrasive, the fabric being impregnated with a substance comprising at least one amine formaldehyde resin.

According to another aspect of the present invention, there is provided a method of producing a treated polyester fabric for use as a carrier for a flexible abrasive, comprising the steps of impregnating a raw polyester fabric with a substance which comprises at least one amine formaldehyde resin.

Surprisingly enough, it has been discovered in experiments carried out in accordance with the invention that excellent abrasive carrier fabrics can be finished by dispensing completely with the use of resins based on phenols, amongst these resorcin, and by using finishing substances containing high concentrations of amine formaldehyde resins.

Such methods according to the invention have been found to offer the advantage of being able to harden the finish at substantially reduced temperatures than when using phenol resins, at speeds which are economically acceptable.

Furthermore, the used air is not charged with phenols.

Preferred methods according to the invention can produce abrasives with reduced expansion, using relatively cheap raw materials, and such abrasives possess a grain adhesion which, when grinding under great stress, is superior to that of abrasives on polyester fabrics finished with phenol resins.

The following examples serve to illustrate the invention.

EXAMPLE 1

A fabric consisting of polyester staple fibre yarn, satin weave 4/1, 290 g/m$^2$, 37 threads/cm in the warp and 15 threads/cm in the weft, is impregnated with the following mixture:

50 parts urea formaldehyde resin (molar ratio: urea:formaldehyde=1:1.8; water dilutability 1:4, solid content 80% by weight);
80 parts styrene acrylate dispersion (40% glass transition temperature +25° C.);
20 parts water; and
0.5 parts antifoaming agent, and dried at 130°.

The yield of impregnating mixture is 100 g/m$^2$ (dry).

A back coating is subsequently applied consisting of:

150 parts impregnating mixture according to the above formula; and
75 parts kaolin, and dried at 130°.

The yield of coating is 90 g/m$^2$ (dry).

An abrasive is produced from the fabric thus finished, by applying, in a conventional manner, a phenol resin based bonding agent with abrasive grain, grain size 36, electrostatically strewn thereon, and a covering bonding agent based on phenol resin.

The abrasive thus obtained has a rigidity which comes within the range of the types termed "X-abrasives." The relative expansion with a unit stress of 900 N/5 cm is 1.8%. The grain adhesion is so great that, when grinding steel tubes with a bearing pressure of 35 N, the grains do not break away; rather, the abrasive grains are worn to stumps.

In contrast, an abrasive was produced on a polyester fabric which has been finished according to the method described in German Offenlegungsschrift 2 531 642, Example 2, using phenol resins. As was to be expected, vapours containing phenol escaped into the used air as the finishing substances were drying. The relative expansion of the completed abrasives at 900 N/5 cm was 3%, and when grinding steel tubes at the above-specified bearing pressure, numerous abrasive grains broke away so that the abrasion test was broken off before they had worn down to stumps.

EXAMPLE 2

The fabric specified in Example 1 is impregnated with the following mixture:

53.3 parts melamine formaldehyde resin (solid content 75%, viscosity according to German Industrial Standard 35211 120 seconds, density 1.23 g/cm$^3$);
80 parts styrene acrylate dispersion (40%, glass transition temperature +25° C.);
16.7 parts water; and
0.5 parts antifoaming agent, and dried at 130° C.

The yield of coating is 90 g/m$^2$ (dry).

Further processing to produce the completed abrasive takes place as described in Example 1.

The abrasive has an X-rigidity, an expansion of 1.6% at 900 N/5 cm, and when grinding steel tubes with 35 N bearing pressure, the grains do not break away.

We claim:

1. A flexible abrasive comprising abrasive particles bonded to a carrier which comprises a polyester fabric impregnated with a substance comprising at least one amine formaldehyde resin.

2. A flexible abrasive according to claim 1 wherein the substance comprises a urea formaldehyde resin.

3. A flexible abrasive according to claim 1 wherein the substance comprises a melamine formaldehyde resin.

4. A method of producing a treated polyester fabric for use as a carrier of a flexible abrasive which comprises impregnating a raw polyester fabric with a substance which in the dry state comprises at least 10% by weight of at least one amine formaldehyde resin, the amount of substance impregnated being such that after drying the substance weighs at least 20% of the weight of the raw fabric, and drying the substance to form the desired treated fabric.

5. A method according to claim 4 which includes the additional step of applying a backing coating to the fabric after the drying step.

6. A method according to claim 5 wherein the backing coating comprises a mixture of said substance and kaolin.

7. A method according to claim 4 wherein the substance comprises a urea formaldehyde resin.

8. A method according to claim 4 wherein the substance comprises a melamine formaldehyde resin.

9. A method of producing a flexible abrasive which comprises impregnating a raw polyester fabric with a substance which in the dry state comprises at least 10% by weight of at least one amine formaldehyde resin, the amount of the substance impregnated being such that after drying the substance weighs at least 20% of the weight of the raw fabric, drying the substance, and bonding abrasive particles to the thus treated fabric.

10. A treated polyester fabric produced in accordance with the method of claim 4.

11. A flexible abrasive produced in accordance with the method of claim 9.

* * * * *